Aug. 14, 1928.    J. W. GARDNER    1,680,869
LUBRICATING DEVICE
Filed April 17, 1924    2 Sheets-Sheet 1
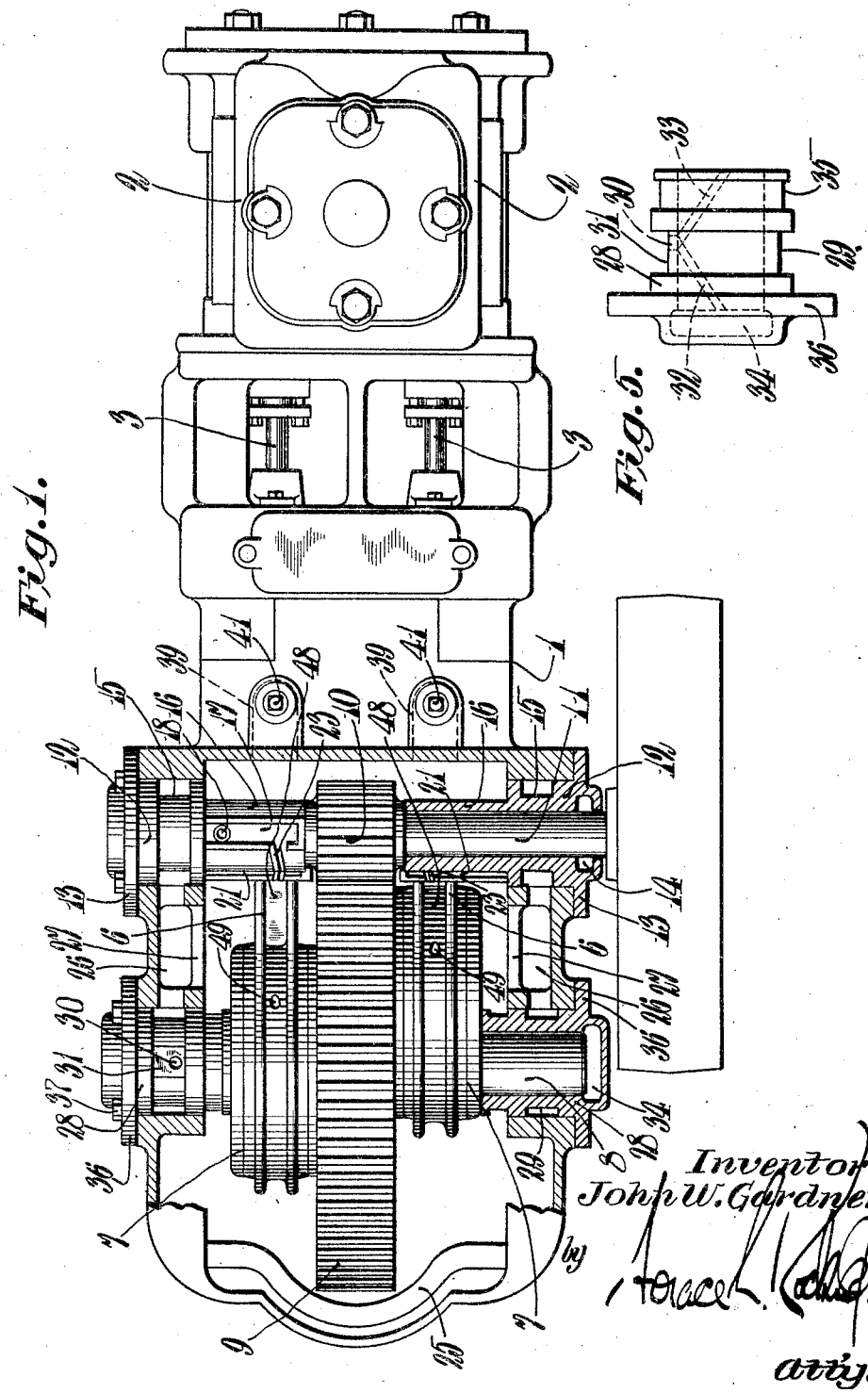
Inventor:
John W. Gardner;
by
atty.

Aug. 14, 1928.
J. W. GARDNER
1,680,869
LUBRICATING DEVICE
Filed April 17, 1924    2 Sheets-Sheet 2
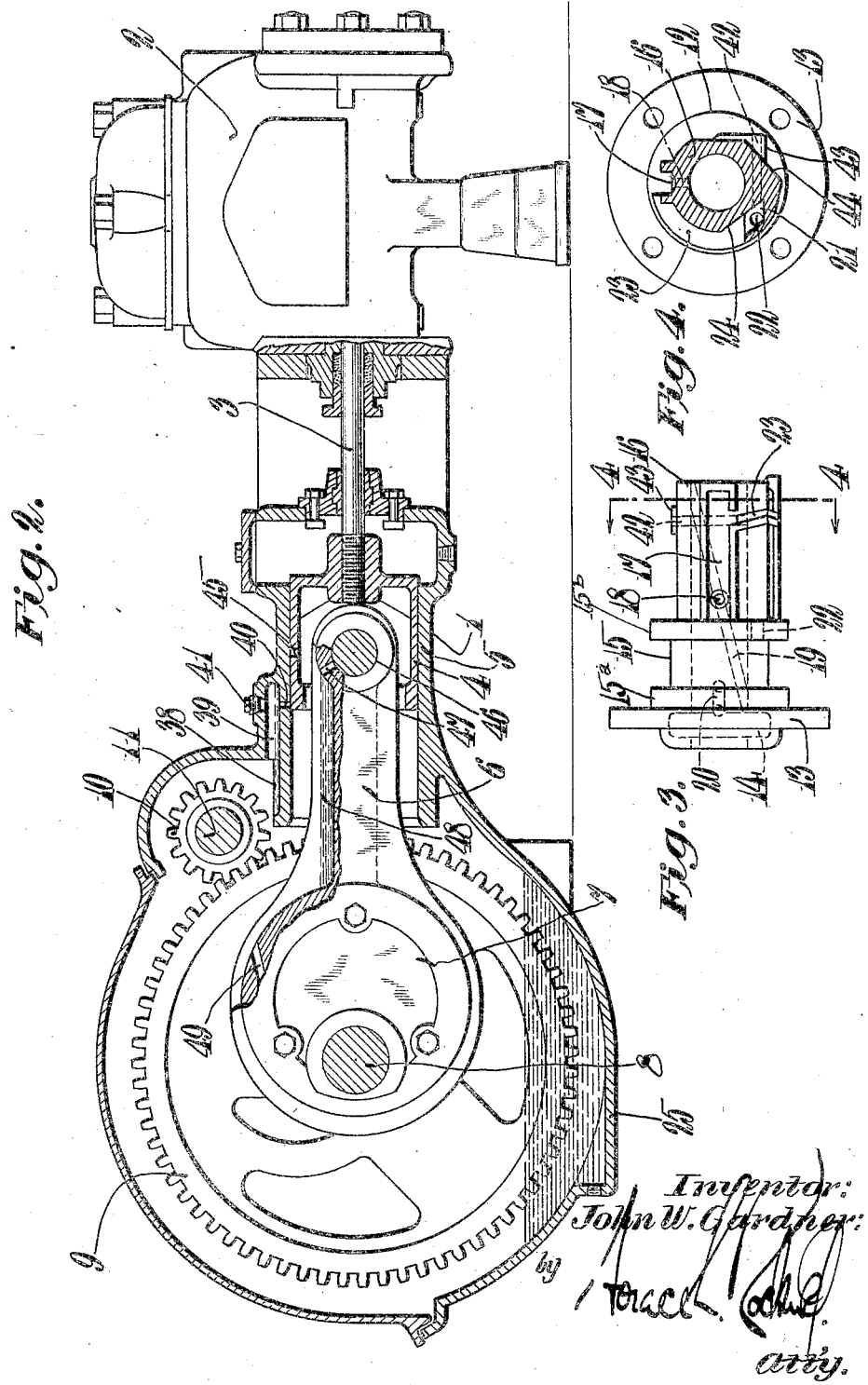

Patented Aug. 14, 1928.

1,680,869

UNITED STATES PATENT OFFICE.

JOHN W. GARDNER, OF QUINCY, ILLINOIS, ASSIGNOR, BY MESNE ASSIGNMENTS, TO GARDNER-DENVER COMPANY, A CORPORATION OF DELAWARE.

LUBRICATING DEVICE.

Application filed April 17, 1924. Serial No. 707,255.

My invention relates to lubricating devices.

It has for its object to provide an improved lubricating mechanism and more particularly such a mechanism especially adapted to use in connection with pumps and generally similar mechanisms structurally, whereby the various parts of the mechanism requiring lubrication are effectively and automatically supplied with lubricant in an improved manner. A further object of my invention is to provide an improved lubricating mechanism of the general type covered by my co-pending application Serial No. 636,882, filed May 5, 1923, having improved means for supplying lubricant to the bearings, cross head guides, and other elements of a pump, this improved means being of an improved and simplified character especially adapted to use in connection with slip bearings and adapted to collect lubricant from the large amount of the same squeezed out between the pump gears and heretofore largely unutilized in devices utilizing such bearings, and to distribute said lubricant to the various parts. These and other objects and advantages of my invention will however, be hereafter more fully explained.

In the accompanying drawings I have shown for purposes of illustration one form which my invention may assume in practice, illustrating the same as applied to a pump, although it should be understood that my invention may be applied to other devices if desired.

In the accompanying drawings,—

Fig. 1 is a plan view partially in section showing a duplex pump equipped with my improvement.

Fig. 2 is a side elevation partially in section showing the same mechanism.

Fig. 3 is a plan view of one of the driving shaft bearings.

Fig. 4 is a transverse sectional view of the same on line 4—4 of Fig. 3.

Fig. 5 is a plan view of one of the driven shaft bearings.

In this illustrative construction I have shown a duplex power pump comprising a generally horizontal frame 1 having a plurality of horizontally disposed parallel pump cylinders 2 and suitable pump pistons operating therein by means of piston rods 3. Each of these rods is operated in a usual manner through a cross head 4 movable in a suitable cross head guide 5 formed on the frame and connected through an improved lubricating connecting rod 6 with a suitable crank, herein an eccentric 7, carried on a transverse rear crank or driven shaft 8. This shaft 8 in turn carries a large spur gear or main gear 9 rotatable thereon between the two eccentrics attached thereto as shown. This gear 9 also meshes with a spur pinion 10 disposed on an upper laterally offset axis extending transversely above the connecting rods and herein carried on a transverse upper driving or jack shaft 11 adapted to be driven in any suitable way by power, both the shafts 8 and 11 being suitably journaled in the frame 1 as hereinafter described, while improved lubricating mechanism likewise hereinafter described is provided to lubricate all the necessary parts of the mechanism.

Referring more particularly to Fig. 1 it will be noted that the shaft 11 is journaled on the frame 1 at its opposite ends in slip bearings 12, each of which is bored from end to end and encloses one end of the shaft, herein extending thereon up to a point closely adjacent the pinion 10. As shown, each of these bearings 12 is also provided on its outer end with an end member or flange 13 integral therewith and is also preferably internally grooved annularly as shown to form an enlarged oil pocket or collecting means 14 surrounding and communicating with the outer end of the bearing bore. Herein the member 13 is also suitably fixed to the frame as by screws around the bore in the frame which receives the bearing. As shown each of these bearings 12 is also provided between its ends with annular flanges of the same diameter and of smaller diameter than the flange 13 and forming between them an annular groove 15 of substantial depth. Herein these flanges, indicated at 15$^a$, 15$^b$, are disposed more closely adjacent the outer end, one projecting inwardly from the base of the member 13 and the other being longitudinally spaced therefrom and cooperating therewith to form positioning means for the bearing on opposite sides of the groove 15. Moreover, it will be noted that each of these bearings 12 is provided with an elongated inner end or integral sleeve 16 closely fitting the shaft and extending as stated to a point adjacent the pinion 10. It will also be noted that each of these sleeves has a longitudinal slot or trough 17 in the upper surface thereof adapted to receive lubricant flowing down from the pinion 10 and communicating with the bearing bore through a vertical oil hole 18 in its bottom. Herein the lubricant is distributed in the bore through grooves 19 (see Fig. 3) in the bearing surface one of which communicates with the annular chamber 14 previously mentioned which in turn collects the excess and delivers it to the groove 15 through a bottom port 20, herein extending through the bottom of the flange 15$^a$. Attention is also directed to the fact that each sleeve portion 16 carries improved lubricant intercepting and distributing means. In this illustrative construction, these include a trough 21 having an open mouth at its top and extending longitudinally of the bottom of the portion 16 on the side and end thereof adjacent the gear 9 and projecting laterally relative to the shaft 11 and into the path of the lubricant squeezed out laterally by the gears 9 and 10 adjacent the mesh line thereof. Herein, each of these troughs 21 extends from a point adjacent the point of mesh of the gears 9 and 10 to the nearest wall of the groove 15 and at its outer end has a port 22 communicating with the groove 15. It will also be noted that each trough passes laterally beneath an upwardly and outwardly inclined baffle 23 formed on the sleeve 16 and leading at its upper end through the adjacent side wall of the inner end of the slot or trough 17 in such manner as to form a longitudinal abutment 17′ of the portion of the latter adjacent the trough 21. Moreover, the trough 21 is what may be called underslung in such manner as to give it substantial capacity while still enabling it to be disposed properly within the lines of the slip bearing, the same herein being disposed at one side of an inclined overhanging surface 24 on the sleeve 16, and having a protruding lip, likewise within the lines of the slip bearing, cooperating with said surface 24 to form a very effective collecting means. Thus it will be observed that when the main gear 9 rotates in lubricant in the bottom of its usual gear and lubricant casing 25, the lubricant which will be carried up by the gear 9 and squeezed out between the teeth of the gears 9 and 10 will not only be supplied to the troughs 17 from the pinion 10, but will be intercepted or collected at each side of its point of mesh with the gear 10 and supplied by each of the baffles 23 to the trough 17, port 18, grooves 19 and 14, port 20, and groove 15 in such manner as substantially to augment the supply of lubricant to the top of the bearings 12, while each trough 21 at the opposite end of the baffle 23 also supplies it through the port 22 to the groove 15, the excess lubricant supplied through the ports 22 thus being brought together in the grooves 15.

In my improved construction I have also provided improved means whereby lubricant may be supplied from these intercepting and collecting means through these grooves 15 in the bearings 12 to the bearings for the shaft 8 which, as previously described, is located parallel to the shaft 11 and slightly below the same, the supply of lubricant to its bearings also being as herein preferably automatic. More specifically, it will be noted that an inclined passage 26 having a beaded edge forming a lateral overflow 27 into the reservoir 25, is formed in each side of the frame 1 between the shafts 8 and 11, which passage 26 in turn through ports communicates at its ends and above its bottom with the annular groove 15 in one of the bearings 12 and also with a similar groove in a bearing 28 for the shaft 8, herein also of the slip type. As shown, each bearing 28 has an annular groove 29 therein, similar to the groove 15, and a radial port 30, formed in a flat 31 thereon, herein on the top thereof, supplying lubricant from the groove to the shaft 8 and diverging spiral grooves 32, 33 in the bearing surface, one of which leads to an enclosed annular chamber 34 at the outer end of the bearing bore while the other leads to the adjacent eccentric surface, passing inside an annular groove 35 disposed inside the chamber 25. As shown, each bearing 28 is also held in position on the frame by a suitably flanged cover plate 36 similar to the member 13 and formed integral with the bearing and attached to the frame by suitable means, as by screws 37. As a result of this construction, it will be observed that not only is the excess lubricant from each groove 14 delivered to its main shaft bearing through the groove 15, but another constant supply of lubricant is maintained from the intercepting and collecting means and the port 22 to the annular groove 15 in each bearing 12 and to the annular groove 29 in each bearing 28 and to the radial ports 30 and spiral grooves 32, 33, chambers 34, shaft 8, and adjacent eccentric surfaces, in such manner as automatically to maintain the parts properly lubricated, the excess being returned to the chamber 25 through the overflow 27 and some of course finding its way to the bath through the bores of the bearings 28.

Improved provision is also made herein whereby lubricant is supplied to the cross head guides and the connecting rod pivots within the cross head, this lubrication also being automatic. Herein it will be noted that the cross head guides 5 extend transversely relative to and beneath the shaft 11 and longitudinally of the frame to points in front of and beneath that shaft and that a reservoir 38 is provided in the upper surface of the rear end of the guides. As shown, chamber 38 also extends longitudinally of the shaft 11 and is provided with a pair of relatively laterally disposed extensions 39, herein of the same depth as the reservoir 38 and disposed longitudinally of the frame. Herein, each extends over a cross head bearing 5 to a point substantially mid-way of the ends of its cross head bearing and is provided adjacent said point with a downwardly opening port or oil passage 40 through which lubricant may pass down to the bearing 5 and cross head 4, a suitable plug 41 preferably being provided to permit access to this aperture 40 for cleaning, etc. Attention is also directed to the fact that a horizontal passage 42 is provided in each sleeve 16, leading from the trough 21 therein transversely of the bearing to a point above the reservoir 38, this passage 42 extending through an extension 43 which is located on the opposite side of the sleeve from the trough and extends laterally from an inclined surface 44 on the sleeve 16. It will also be observed that each cross head 4 has an aperture 45 therein adapted to permit lubricant supplied to its guide and the outer surface thereof, to pass into the interior thereof and to the connecting rod pin or pivot 46, a suitable passage or port 47 being formed in the connecting rod for the latter purpose. As a result of this mechanism it will be observed that a supply of lubricant flows down from the pinion 10 and bearings 12 to the reservoir means 38 above the crosshead guides, and that another supply of lubricant carried up by the gear 8 is supplied through each passage 42 to the reservoir 38 and from the latter through the extensions 39 and ports 40 to the cross head guides 5 to lubricate the latter and the cross heads 4, and from the cross heads 4 through the passages 45 and 47 to lubricate the connecting rod pins or pivots 46.

Attention is here also directed to the fact that improved means are herein also provided for lubricating the connecting rod connections to the eccentrics 7 and pivots 46. This lubricating supply connection herein comprises a supply chamber 48 formed in the upper side of each connecting rod and extending longitudinally thereof and communicating at one end not only with the passage 47 previously mentioned but at its opposite end with an inclined passage 49 leading to the eccentric, the arrangement of the passages 47 and 49 preferably being as shown in Fig. 2. Obviously as a result of this construction, as each connecting rod is operated under the bearings 12, excess lubricant carried up by the gear 9 will be supplied to the improved lubricating means thereon as the gear 9 rotates in such manner as to maintain the desired supply not only to the eccentric 7 but, irrespective of whether or not the aperture 45 becomes plugged, or, in fact, is even provided, also to maintain the desired supply to the pin 46 at the opposite end of the connecting rod, the chamber 48 normally being flooded with lubricant and acting alternately to flood lubricant to the different passages 47 and 49 as the rod operates, any excess being returned to the bath in the casing 25. If desired, the lower end of each baffle 23 may also be inclined slightly laterally, as shown, to divert more of the squeezed out lubricant to each chamber 48.

In the operation of my complete construction, it will be evident that each of the bearings for the shafts and for the cross heads and connecting rods will be supplied with a continuous stream of lubricant automatically flushing out the bearings without the necessity for attention on the part of the operator, the lubricant being maintained in such supply as to flood the needed parts and thereby maintain them at maximum operating efficiency without any attention on the part of the operator other than an occasional replenishing of the supply in the bath in the bottom of the gear casing. More specifically, the longitudinal troughs 17 of the bearings 12 are not only supplied from the splash with lubricant flowing from the pinion 10, as heretofore, but are also supplied by the baffles 23 with an additional supply of lubricant deflected into the same by these baffles. From these troughs 17 the lubricant is supplied to the bores of the bearings 12 and longitudinally of the latter to the grooves 14, which collect the excess and supply it through the ports 20 to the passage means leading to the main shaft bearings 28, herein including the grooves 15 and the passages in the frame. At the same time, herein a separate supply of lubricant bypasses the bore of the bearings 12 through the troughs 21 and is also supplied through the ports 22 and grooves 15 to these bearings 28. Also, it will be noted that the baffle 23 thus provides means receiving lubricant projected laterally by the gearing which at one end delivers this lubricant to the jack shaft bearing and at the other end delivers it through connected passage means to the main shaft bearing. At the same time it will be evident that the crosshead bearings will be supplied with lubricant from the ports 42 and also with the overflow from the troughs 17 and from the pinion 10, while the connecting rods extending beneath the bearings 12 will also receive lubricant in their troughs 48 for distribution to the connecting rod bearings.

As a result of my improved construction, it will be noted that the supply to both of the shaft bearings, the crosshead guides, and the connecting rods is obtained by the use of stationary means, all movable parts such as gearing, rings, or the like, requiring attention on the part of the operator, being eliminated. While this supply is herein obtained by collecting connections acting to collect the lubricant adjacent the point of gear mesh, and this is thought preferable in ordinary circumstances, it will be evident that certain of my improved results may be obtained irrespective of the particular location of the collecting means. When the collecting means are also so located as herein, it is found that, irrespective of the direction of rotation of the gear 9, lubricant carried up by the latter and on it and the pinion 10 is intercepted whenever the gearing is rotated at a normal speed, the trough 21 and baffle 23 cooperating in each direction of rotation of the gearing and the longitudinal abutment 17' assisting in intercepting lubricant during rotation in one direction. Moreover, by rotating the gear 9 in such a direction that the oil is carried over the top thereof before it is squeezed out by the pinion, it is also possible to supply an adequate amount of lubricant even when an exceedingly slow speed is required. Further, it will be observed that the lubricating means is carried entirely by parts of the mechanism without the necessity for any additional outside connections such as have heretofore been necessary, thereby providing a type of device of improved and simplified construction. Attention is also directed to the fact that while many connections are within the frame, the amount of machining of the frame is maintained at a minimum by forming most of the passage means in bearings or other ordinarily machined parts in which the additional passage means may be readily formed. Particular attention is also directed to the fact that as a result of my improved construction slip shaft bearings are also made possible, both the bearings 28 and 12 being of this type and having their several passage means so disposed as to permit their ready insertion in apertures in the gear casing. These and other advantages of my improved construction will, however, be clearly apparent to those skilled in the art.

While I have in this application specifically shown one embodiment which my invention may assume in practice, it will be understood that the invention is not limited in its adaptation to pumps of the character described or to embodiment in the particular form chosen for purposes of illustration, the same being adapted to other generally similar mechanism having provision for lubricating generally similarly located bearings, or cross heads, or connecting rods, and also being capable of being modified in various ways without departing from its spirit or the scope of the appended claims.

What I claim as new and desire to secure by Letters Patent is:

1. The combination with a plurality of shafts, and gearing rotatable by one of the same and including a gear carried by another and dipping in an oil bath and a meshing non-dipping gear, of stationary means for intercepting lubricant as it is projected laterally by said meshing gear and distributing said intercepted lubricant to the bearings of different shafts.

2. The combination with a plurality of shafts each having spaced bearings, and gearing between the shaft bearings rotatable by one of the shafts and including a gear carried by another and dipping in an oil bath and a meshing non-dipping gear, of stationary means for intercepting at each side of the plane of operation thereof lubricant as it is projected laterally by said meshing gear and distributing said intercepted lubricant to the bearings of the different shafts.

3. The combination with an operating device including a plurality of shafts, bearing means therefor including a bearing for each of the latter, and meshing gearing rotatable in either direction by one of said shafts and including a gear carried by another shaft and dipping in an oil bath, of stationary means intercepting above the axis of said gear lubricant as it is squeezed out laterally by the teeth of said gearing in either direction of rotation thereof and distributing said intercepted lubricant to said shaft bearings.

4. The combination with an operating device including a plurality of shafts, a plurality of spaced bearings for each shaft, and meshing gearing between said bearings rotatable in either direction by one shaft and including a gear carried by another shaft and dipping in an oil bath, of stationary means at each side of said gear intercepting above the axis of said gear lubricant as it is squeezed out laterally by the teeth of said gearing in either direction of rotation thereof and distributing said intercepted lubricant to said shaft bearings.

5. In combination, an operating device having a plurality of shafts, bearing means including a bearing for each of the latter, and meshing driving gearing on said shafts including a gear dipping in an oil bath and rotatable in either direction therein, stationary means at one side of said gear for collecting lubricant squeezed out between the teeth of said gearing in either direction of rotation thereof, and stationary means for supplying said lubricant to said shaft bearings.

6. In combination, an operating device having a plurality of shafts, bearing means including a bearing for each of the latter, and meshing driving gearing on said shafts including a gear dipping in an oil bath, and lubricating means operative in either direction of rotation of said gearing and including a trough so disposed adjacent the mesh line thereof as to receive lubricant carried up by said dipping gear in either direction of rotation thereof and stationary means for supplying said lubricant to said bearings.

7. In combination, an operating device having a frame, a plurality of shafts, bearings for each of the latter including a bearing member, and meshing driving gearing on said shafts including a gear rotating in an oil bath, and stationary collecting and distributing means receiving lubricant for both bearings including a lubricant collecting trough formed in said bearing member and communicating passages in said frame and said bearing member supplying lubricant carried up on said gear through said bearing member to both of said bearings.

8. In combination, an operating device having a frame, a plurality of shafts, bearing means including a slip bearing member for each of the latter, and meshing driving gearing on said shafts including a gear rotating in an oil bath, and stationary collecting and distributing means receiving lubricant for both bearings including a trough in one of said bearing members and communicating passages in said frame and slip bearing members supplying lubricant carried up on said gear through one of said slip bearing members to each of said bearing members.

9. In combination, an operating device having a plurality of shafts, bearing means including a bearing for each shaft, and meshing driving gearing on said shafts including a gear dipping in an oil bath and spaced laterally from the walls of said bath, and lubricating means utilizing the flow of lubricant to distribute the same to said bearings and operative in either direction of rotation of said gearing including a stationary collecting device collecting adjacent the mesh line of said gearing lubricant normally returned directly to the bath at that point and stationary passage means leading therefrom to said bearings.

10. In combination, a gear rotating in an oil bath, a meshing gear, shafts for said gears, bearings for said shafts, lubricant collecting means adjacent the point of mesh of said gearing, and branch passages leading from said collecting means to bearings for both shafts including a baffle leading to one of said passages.

11. In combination, a frame, a plurality of longitudinally and vertically spaced shafts journaled thereon, bearings therefor, meshing gearing on said shafts including a gear dipping in an oil bath and so disposed relative thereto as to exert no pumping action thereon, and stationary means for supplying lubricant from adjacent the point of mesh of said gearing to bearings for both shafts including normally flooded passage means in said bearings and in said frame.

12. In combination, a frame, a plurality of longitudinally and vertically spaced shafts journaled thereon, bearings therefor, meshing driving gearing on said shafts including a gear dipping in an oil bath, and stationary means receiving lubricant as it is squeezed from between the teeth of said gearing and supplying it to bearings for both shafts irrespective of the direction of rotation of said gearing including passage means in said bearings and in said frame between said bearings.

13. In combination, a frame, a plurality of shafts journaled thereon, bearings therefor, meshing driving gearing on said shafts including a gear dipping in an oil bath and so located relative thereto as to exert no pumping function, and stationary means receiving lubricant as it is squeezed from between the teeth of said gearing and supplying it to bearings for both shafts including passage means in said bearings and in said frame.

14. In combination, a frame, a plurality of shafts journaled thereon, bearing members therefor, meshing gearing on said shafts including a gear dipping in an oil bath, and means for supplying lubricant from said gearing to bearing members for both shafts in either direction of rotation of said gearing including a trough adjacent the point of mesh of said gears receiving lubricant as it is squeezed out between the teeth of said gear and communicating passage means leading from said trough through both bearings.

15. In combination, a frame, a pair of shafts journaled thereon, bearings therefor, meshing driving gearing on said shafts including a gear dipping in an oil bath, a crosshead operatively connected to said gear and having a guide, and stationary means for collecting and distributing lubricant receiving the same adjacent the line of mesh as it is squeezed from between the teeth of said gearing and distributing it to said bearings and said crosshead guide.

16. In combination, a frame, a plurality of shafts journaled thereon, bearings therefor, meshing gearing on said shafts including a gear dipping in an oil bath, a crosshead operatively connected to said gear and having a bearing on said frame, and means for supplying lubricant squeezed from between said gearing to said bearings and said crosshead bearing including a trough adjacent the point of mesh of said gears and branching passages leading therefrom to different bearings.

17. In combination, a frame, parallel shafts thereon, bearings therefor, meshing gearing on said shafts including a gear dipping in an oil bath, a crosshead operatively connected to said gear and having a bearing on said frame, and means for delivering oil squeezed out between said gears to the bearings on each side of said gearing and to said crosshead bearing including a plurality of receiving members disposed on opposite sides of said gear adjacent the point of mesh of said gears.

18. In combination, a frame, parallel shafts thereon, bearings therefor, meshing gearing on said shafts including a gear dipping in an oil bath, and means for delivering oil to the shaft bearings on one side of said gearing including a receiving member disposed adjacent the point of mesh of said gears and communicating passage means leading to said bearings including a passage in said frame having a lateral overflow into the oil bath.

19. In combination, a frame, shafts thereon, meshing gearing on said shafts including a gear dipping in an oil bath, and means for lubricating said shafts receiving lubricant at the point of mesh of said gears and including bearings for said shafts, one having provision for collecting said lubricant and both supplied with said lubricant and having passage means therein, and communicating passage means between said passage means.

20. In combination, a frame, shafts thereon, meshing gearing on said shafts including a gear dipping in an oil bath, and means for lubricating said shafts receiving lubricant at the point of mesh of said gears and including slip bearings for said shafts, one of said slip bearings having collecting means thereon and both having distributing means operatively connected to said collecting means.

21. In combination, a gear rotating in an oil bath, a meshing gear, shafts for said gears, a cross head operatively connected to one of said shafts, bearings for said shafts and cross head, and lubricating means for said bearings receiving lubricant adjacent the point of mesh of said gears and directing it to all of said bearings in a branching stream.

22. In combination, a gear rotating in an oil bath, a meshing gear, shafts for said gears, a connecting rod operatively connected to one of said shafts, a cross head operatively connected to said rod, bearings for said shafts, rod, and cross head, and lubricating means for said bearings receiving lubricant adjacent the point of mesh of said gears and directing it to all of said bearings in a branching stream.

23. In combination, a gear rotating in an oil bath, a meshing gear, shafts for said gears, a cross head operatively connected to one of said shafts, bearings for said shafts and cross head, and lubricating means for said bearings including a trough and a baffle adjacent the point of mesh of said gear and a plurality of communicating passages.

24. In combination, a frame, a plurality of shafts journaled thereon, meshing gearing on said shafts including a gear dipping into an oil bath, means for creating a stream of lubricant leading from adjacent the point of mesh of said gears to a bearing of each shaft, a cross head operatively connected to one of said gears and having a guide, and means likewise supplying a stream of lubricant from adjacent the point of mesh of said gears to said cross head guide.

25. In combination, a frame, a plurality of shafts journaled thereon, meshing gearing on said shafts including a gear dipping into an oil bath, means for creating a stream of lubricant leading from adjacent each side of the point of mesh of said gears to a bearing of each shaft, cross heads operatively connected to said gear on opposite sides of the latter and having guides, and means likewise supplying streams of lubricant from adjacent the point of mesh of said gears to said crosshead guides.

26. In combination, a gear casing having side walls and a lubricant chamber, gearing thereon spaced from said walls and including a pinion and a gear meshing therewith and dipping into lubricant in said chamber, longitudinally spaced shafts for said gearing having bearings on said casing, and means for lubricating said shaft bearings including passage means leading to each of the same and supply means therefor comprising an open topped lubricant collecting trough likewise spaced from said walls and also carried by said casing and projecting from the casing directly into the path of lubricant squeezed from between the teeth of said gearing.

27. In combination, a gear casing having side walls and a lubricant chamber, gearing thereon spaced from said walls and including a pinion and a gear meshing therewith and dipping into lubricant in said chamber, longitudinally spaced shafts for said gearing having bearings on said casing, and means for lubricating said bearings including passage means leading to each of the same and supply means therefor comprising an open topped lubricant collecting trough likewise spaced from said walls and also carried by one of the bearings and projecting from said bearing directly into the path of lubricant squeezed from between the teeth of said gearing.

28. In combination, transmission mechanism including meshing gearing having a gear dipping in an oil bath, shafts for said gearing, bearings for said shafts, a connecting rod operatively connected to said gear, a crosshead to which one end of said rod is pivoted, means for lubricating said shafts including collecting means adjacent the line of mesh of said dipping gear receiving lubricant squeezed from between the teeth thereof and having communicating passages leading to said bearings, and means for lubricating said connecting rod including a collecting passage thereon receiving excess lubricant squeezed out from between the teeth of said gear.

29. In combination, an operating mechanism including meshing gearing having a gear dipping in an oil bath, shafts for said gearing, bearings for said shafts, a connecting rod and a crosshead operatively connected to said gear and to one another, means for lubricating said shafts including collecting means adjacent the line of mesh of said dipping gear receiving lubricant squeezed from between the teeth thereof and having communicating passages leading to said bearings, and means for lubricating said connecting rod including a chamber thereon receiving excess lubricant squeezed from between the teeth of said gear and ports leading from said chamber to both of the bearings of said connecting rod.

30. In combination, a frame, an operating mechanism thereon including meshing gearing having a gear dipping in an oil bath, shafts for said gearing, bearings for said shafts, a connecting rod operatively connected to said gear, a crosshead operatively connected to said connecting rod, and means for lubricating said connecting rod and the exterior of said crosshead including a plurality of chambers one of which is carried by said connecting rod and receives excess lubricant squeezed out from between the teeth of said gear and the other of which is carried on said frame and also supplied with said lubricant.

31. In combination, transmission mechanism including a gear dipping in an oil bath, a connecting rod and a cross head operatively connected to said gear on each side thereof, and means for lubricating said connecting rods and cross heads from said gear including a chamber disposed longitudinally of each rod and another transversely of said cross heads.

32. In combination, transmission mechanism including a gear dipping in an oil bath, a connecting rod and a cross head operatively connected to said gear on each side thereof, and means for lubricating said connecting rods and cross heads including a chamber disposed longitudinally of each rod receiving lubricant from said gear, ports leading from said chambers to the pivots of said connecting rods, cross head guides, a lubricant reservoir above said connecting rods and likewise receiving lubricant from said gear, and communicating ports in said reservoir leading to said cross head guides.

33. A slip bearing member having a plurality of external shoulders cooperating to form an external chamber between the ends of the member and laterally extending external attachment means at its outer end.

34. A slip bearing member having a plurality of external shoulders cooperating to form an external lubricant chamber between the ends of the member, said bearing also having an internal chamber at the outer end of the bearing bore communicating with said first mentioned lubricant chamber.

35. A lubricating bearing member having a lubricant trough on its side provided with an open mouth at its top adapted to collect lubricant from adjacent gearing and lubricant conducting means communicating with said trough.

36. A lubricating bearing member having an underslung lubricant receiving trough provided with a mouth adapted to collect lubricant and communicating passages leading therefrom including one leading to the bearing bore and another longitudinally of the bearing externally of the bore.

37. A lubricating bearing member having an underslung lubricant receiving trough provided with a mouth adapted to collect lubricant and communicating passages leading therefrom including one leading transversely of the bearing and another longitudinally thereof externally of the bore.

38. A slip bearing having a plurality of external annular flanges cooperating to form a lubricant chamber between the ends of the same, said bearing also having a reduced inner end and lubricant collecting means thereon communicating with said chamber and within the lines of said flanges.

39. A lubricating bearing member having a trough, a baffle, a lubricant conveying passage supplied by lubricant engaging said baffle, and a second passage supplied by lubricant entering said trough.

40. A lubricating bearing member having a trough extending longitudinally thereof, a baffle adjacent the same and extending transversely relative thereto, a lubricant conveying passage supplied by lubricant engaging said baffle, and a plurality of passages supplied by lubricant entering said trough.

41. A lubricating slip bearing member having a trough at one side thereof, a baffle, a lubricant conveying passage extending longitudinally of the bearing top and supplied by lubricant engaging said baffle, and lubricant passage means communicating with said trough.

42. A lubricating bearing member having an underslung trough provided with longitudinal and lateral passage means and a baffle disposed above the longitudinal passage means and communicating with an upper passage means leading to the bearing surface within the bearing.

43. A lubricating slip bearing member having an underslung trough provided with longitudinal and lateral passage means, a baffle disposed above the longitudinal passage means and an upper passage means leading to the bearing surface within the bearing and receiving lubricant from said baffle, said portions being so disposed as to permit free longitudinal insertion of the bearing member into its socket.

44. In combination, meshing gearing including a gear dipping in a lubricant bath and a cooperating meshing gear, bearings for said gearing, and means lubricating a bearing for each gear including a lubricant trough adjacent the line of mesh of said gears and cooperating stationary distributing means leading to said bearings, said lubricating means being so located that said bearings are supplied with lubricant carried up by said dipping gear irrespective of the direction of rotation thereof.

45. In combination, meshing gearing including a gear dipping in a lubricant bath and a cooperating meshing gear, bearings for said gearing, and means lubricating a bearing for each gear including a lubricant collecting trough having a mouth between the axes of said gears and adjacent the line of mesh thereof and cooperating stationary distributing means leading to said bearings, said lubricating means being so located as to cause said bearings to be supplied with lubricant in either direction of said gearing and also including a lubricant intercepting member intercepting lubricant on one of said gears and supplementing the supply to said distributing means.

46. In combination, meshing gearing including a gear dipping in a lubricant bath and a cooperating meshing gear, bearings for said gearing, and means lubricating a bearing for each gear including a lubricant collecting trough having a mouth between the axes of said gears and adjacent the line of mesh thereof and cooperating stationary distributing means leading to said bearings, said lubricating means being so located as to cause said bearings to be supplied with lubricant in either direction of said gearing and also having a lubricant intercepting member intercepting lubricant on said meshing gear and supplementing the supply to said distributing means, and both said trough and intercepting member being carried by a bearing for said meshing gear.

47. In combination, a frame, a plurality of operating shafts operatively connected together by gearing including a gear dipping in an oil bath, bearings carrying said shafts and seated in said frame including slip bearings for the driving shaft each having a lip adapted to collect lubricant as it is squeezed out laterally by said gearing, and means communicating with said lip and including passage means in said bearings and in said frame whereby lubricant carried up by said gear may be circulated through said bearings.

48. In a pump comprising a plurality of shafts, meshing gearing including a gear dipping in an oil bath and an element meshing therewith above the axis of said dipping gear, a crosshead operatively connected on one side of said dipping gear for operation thereby, bearings for said shafts at each side of said gearing, and stationary means for intercepting lubricant carried up by said gear as it is projected laterally in opposite directions by said meshing element and distributing said intercepted lubricant to the bearings for said shafts and to said crosshead.

49. In combination, operating mechanism including a plurality of shafts rotating on parallel axes and a gear operatively connected to one of the same and rotating in a plane intersecting the axis of the other shaft, a lower bath in which said gear dips, bearings for said shafts, and lubricating devices for the latter utilizing lubricant carried up by said gear and including means for projecting said lubricant laterally relative to the gear as the latter rotates and cooperating stationary means receiving said projected lubricant and so disposed as to cause said lubricant to flow therefrom to the bearings of different shafts.

50. In combination, operating mechanism including a plurality of shafts rotating on parallel axes and a gear operatively connected to one of the same and rotating in a plane intersecting the axis of the other shaft, a lower bath in which said gear dips, bearings for said shafts, and lubricating devices for the latter utilizing lubricant carried up by said gear and including means for projecting said lubricant laterally relative to the gear as the latter rotates and cooperating stationary means receiving said projected lubricant and so disposed as to cause said lubricant to flow therefrom to the bearings of different shafts irrespective of the direction of rotation of said gear.

51. In combination, operating mechanism including a plurality of shafts rotating on parallel axes and a gear operatively connected to one of the same and rotating in a plane intersecting the axis of the other shaft, a lower bath in which said gear dips, bearings for said shafts, and lubricating devices for the latter utilizing lubricant carried up by said gear and including means for projecting said lubricant laterally relative to the gear as the latter rotates and cooperating stationary means receiving said projected lubricant and so disposed as to cause said lubricant to flow therefrom to the bearings of different shafts, said stationary means including an intercepting means presenting an abutment laterally spaced from said gear and disposed substantially longitudinally of the plane of operation thereof and means forming supply passages at the opposite ends of said abutment.

52. In combination, operating mechanism including a plurality of shafts rotating on parallel axes, a gear operatively connected to one of the same and rotating in a plane intersecting the axis of the other shaft, and a crosshead operatively connected to said gear, a lower bath in which said gear dips, bearings for said shafts and said crosshead, and lubricating devices for the latter utilizing lubricant carried up by said gear and including means for projecting said lubricant laterally relative to the gear as the latter rotates and cooperating stationary means receiving said projected lubricant and so disposed as to cause said lubricant to flow therefrom to the bearings of different shafts and to the crosshead bearing.

53. In combination, operating mechanism including a plurality of shafts rotating on parallel axes, a gear operatively connected to one of the same and rotating in a plane intersecting the axis of the other shaft, and a crosshead operatively connected to said gear, a lower bath in which said gear dips, bearings for said shafts and said crosshead, and lubricating devices for the latter utilizing lubricant carried up by said gear and including means for projecting said lubricant laterally relative to the gear as the latter rotates and cooperating stationary means receiving said projected lubricant and so disposed as to cause said lubricant to flow therefrom to the bearings of different shafts and to the crosshead bearing irrespective of the direction of rotation of said gear.

54. In combination, operating mechanism including a plurality of shafts rotating on parallel axes, a gear operatively connected to one of the same and rotating in a plane intersecting the axis of the other shaft, and a crosshead operatively connected to said gear, a lower bath in which said gear dips, bearings for said shafts and said cross-head, and lubricating devices for the latter utilizing lubricant carried up by said gear and including means for projecting said lubricant laterally relative to the gear as the latter rotates and cooperating stationary means receiving said projected lubricant and so disposed as to cause said lubricant to flow therefrom to the bearings of different shafts and to the crosshead bearing, said stationary means including an intercepting means presenting an abutment laterally spaced from said gear and disposed substantially longitudinally of the plane of operation thereof and means forming supply passages at the opposite ends of said abutment.

55. The combination with a casing having an oil bath, a gear dipping in said bath, a non-dipping gear meshing with said dipping gear above the axis of the latter, a shaft carrying said dipping gear, a longitudinally spaced parallel shaft driving both of said gears, and bearings for each shaft disposed on opposite sides of said gearing, of stationary lubricant intercepting and distributing means intercepting above the axis of the dipping gear and between the casing and said gearing lubricant carried up by said dipping gear as said lubricant is projected laterally in opposite directions toward said casing by said meshing gear and distributing said laterally projected lubricant from the points of interception to the shaft bearings.

56. The combination with a casing having an oil bath, a gear dipping in said bath and substantially spaced laterally from the casing, a non-dipping gear meshing with said dipping gear above the axis of the latter, a shaft carrying said dipping gear, crossheads operatively connected to said dipping gear on opposite sides thereof, a longitudinally spaced parallel shaft driving both of said gears, and bearings for each shaft disposed on opposite sides of said gearing including bearings outside said crosshead connections, of stationary lubricant intercepting and distributing means operative in either direction of rotation of said gearing and intercepting above the axis of the dipping gear and between the casing and said gearing lubricant carried up by said dipping gear as said lubricant is projected laterally in opposite directions toward the casing walls by said meshing gear and distributing said laterally projected lubricant from the points of interception to said shaft bearings and crossheads.

57. A lubricating slip bearing member comprising a sleeve having a longitudinally extending top passage means communicating with the bearing bore, deflecting means at the inner end of the sleeve augmenting delivery to said passage means, and means for drawing off excess lubricant supplied to the bearing bore by said passage including a collecting chamber at the outer end of the bearing bore.

58. A lubricating slip bearing member comprising a sleeve having seating means on its outer end, a longitudinally extending top trough communicating with the bearing bore, and deflecting means adapted to augment delivery to said trough, both said trough and deflecting means being so formed as to permit their insertion in an aperture receiving said seating means.

59. A lubricating slip bearing member having a seating flange at its outer end, a longitudinal trough on its top communicating with the bearing bore, deflecting means at its inner end adapted to augment delivery of lubricant to said trough, and a groove in the outer end of the bearing bore having a bottom outlet extending through said flange.

60. The combination with a gear case having a lubricant bath and a side wall having spaced bearing apertures therein and a passage extending between said apertures, of gearing in said casing spaced from said wall including a dipping gear and a meshing non-dipping gear, and bearings for said gears in said apertures, the bearing for the non-dipping gear carrying lubricant collecting trough means thereon fed from said gearing and delivering collected lubricant to its bore and to said passage, and the bearing in the other aperture having passage means leading to its bore and fed by said passage.

61. In combination, a gear case having a lubricant bath and side walls having spaced bearing apertures therein, gearing in said case spaced from said walls and including a dipping gear and a meshing non-dipping gear having shafts in said apertures, bearings in said apertures, means on the bearing for the non-dipping gear forming a trough communicating with the top of the bore thereof, deflecting means augmenting the supply to said trough of lubricant carried up by said dipping gear, and means likewise supplied from said trough and leading to the other bearing.

62. In combination, a gear case having a lubricant bath and side walls having spaced bearing apertures therein, gearing in said case spaced from said walls and including a dipping gear and a meshing non-dipping gear having shafts in said apertures, bearings in said apertures, means on the bearing for the non-dipping gear forming a trough communicating with the top of the bore thereof, deflecting means augmenting the supply to said trough of lubricant carried up by said dipping gear, means likewise supplied from said trough and leading to the other bearing, and a connecting rod driven by said dipping gear and extending beneath the bearing of said non-dipping gear and having a longitudinal rod lubricating trough means.

63. The combination with a lubricant bath, of gearing including a dipping gear and a non-dipping gear, spaced shafts for said gears, bearings for said shafts, and stationary means for supplying lubricant carried up by said dipping gear to the bearings of both shafts including stationary means at the inner end of the bearing of the non-dipping gear and above the axis of the dipping gear for supplying said lubricant through the top of said bearing to the bore thereof, and passage forming means for collecting and supplying the excess from said bore to the bore of the other bearing.

64. The combination with a lubricant bath, gearing including a dipping gear and a non-dipping gear, shafts for said gears, and bearings for said shafts, of stationary means for supplying lubricant carried up by said dipping gear to the bearings of both shafts including stationary means adjacent the inner end of the bearing of the non-dipping gear and above the axis of said dipping gear supplying said lubricant through the top of said bearing to the bore thereof, and means for bypassing a portion of the lubricant carried up by the dipping gear around the bore of said bearing to the other bearing.

65. In combination with a lubricant bath, a gear dipping therein, a meshing non-dipping gear rotatable on a higher axis, shafts for said gears, bearings for said shafts, and stationary means for lubricating both of said bearings with lubricant carried up by said dipping gear including stationary passage means independent of said bath and leading to the bores of both bearings and stationary means supplying said passage means and having collecting means located at the inner end of the bearing of said non-dipping gear and above the axis of the dipping gear and there intercepting from the lubricant otherwise returned to the bath by said gearing sufficient of said lubricant to lubricate both bearings.

66. In combination, a frame, operating mechanism thereon including meshing gearing having a gear dipping in an oil bath and a cooperating non-dipping gear, shafts for said gearing, bearings for said shafts including a bearing for said non-dipping gear so disposed as to intercept and be lubricated by excess lubricant projected laterally from between the teeth of said gearing, a connecting rod operatively connected to said dipping gear, a crosshead having a bearing on said frame and operatively connected to said connecting rod, and means for lubricating said connecting rod and said crosshead bearing including a plurality of chambers one of which is carried by said connecting rod and receives excess lubricant squeezed out from between the teeth of said gears, and the other of which is carried on said frame and also supplied with said lubricant.

67. In combination, a frame having an oil bath, gearing on said frame substantially spaced from the side walls thereof including a gear dipping in said bath and a meshing non-dipping driving gear rotatable on an axis offset vertically and laterally relative to that of said dipping gear, shafts carrying said gears and carried on said frame on axes higher than the bath, crosshead mechanism on said frame adjacent one end of said bath and having a connecting rod driven by rotation of said dipping gear and extending longitudinally of the bath and below said non-dipping gear shaft, and lubricating means for the latter shaft utilizing the stream of lubricant squeezed out laterally relative to said gears adjacent the mesh line thereof and which would otherwise return unused to the bath, including bearing means intercepting the stream of squeezed out lubricant and located to one side of said non-dipping gear and projecting laterally relative to the non-dipping gear shaft and in the general direction of the dipping gear shaft into the path of said lubricant.

68. In combination, a frame having an oil bath, gearing on said frame substantially spaced from the side walls thereof including a gear dipping in said bath and a meshing non-dipping driving gear rotatable on an axis offset vertically and laterally relative to that of said dipping gear, shafts carrying said gearing and carried on said frame on axes higher than the bath, crosshead mechanism on said frame adjacent one end of said bath and having a connecting rod driven by rotation of said dipping gear and extending longitudinally of the bath and below said non-dipping gear shaft, and lubricating means for said connecting rod and said non-dipping gear shaft utilizing the stream of lubricant squeezed out laterally relative to said gears adjacent the mesh line thereof and which would otherwise return unused to the bath, including, respectively, a trough carried by said connecting rod and intercepting means outside said non-dipping gear and projecting laterally relative to the non-dipping gear shaft into the path of said lubricant.

69. In combination, a frame having an oil bath, gearing on said frame substantially spaced from the side walls thereof including a gear dipping in said bath and a meshing non-dipping driving gear rotatable on an axis offset vertically and laterally relative to that of said dipping gear, shafts carrying said gears and carried on said frame on axes higher than the bath, crosshead mechanism on said frame adjacent one end of said bath and having a connecting rod driven by rotation of said dipping gear and extending longitudinally of the bath and below said non-dipping gear shaft, and lubricating means for said connecting rod and said non-dipping gear shaft utilizing the stream of lubricant squeezed out laterally relative to said gears adjacent the mesh line thereof, including, respectively, a trough carried by said connecting rod and intercepting means outside said non-dipping gear and projecting laterally relative to that shaft into the path of said lubricant, said trough being on the same side of said gearing as said intercepting means and below the latter.

In testimony whereof I affix my signature.

JOHN W. GARDNER.